United States Patent
Kim

(10) Patent No.: US 8,532,833 B2
(45) Date of Patent: Sep. 10, 2013

(54) GRID CONNECTED POWER STORAGE SYSTEM AND INTEGRATION CONTROLLER THEREOF

(75) Inventor: Seong-Joong Kim, Yongin-si (KR)

(73) Assignee: Samsung SDI Co., Ltd., Gyeonggi-do (KR)

(*) Notice: Subject to any disclaimer, the term of this patent is extended or adjusted under 35 U.S.C. 154(b) by 263 days.

(21) Appl. No.: 13/071,370

(22) Filed: Mar. 24, 2011

(65) Prior Publication Data

US 2012/0089261 A1 Apr. 12, 2012

(30) Foreign Application Priority Data

Oct. 6, 2010 (KR) .................. 10-2010-0097368

(51) Int. Cl.
*H04L 12/12* (2006.01)
*H04L 12/46* (2006.01)

(52) U.S. Cl.
USPC ........................................... 700/286; 455/78

(58) Field of Classification Search
None
See application file for complete search history.

(56) References Cited

U.S. PATENT DOCUMENTS

| | | | |
|---|---|---|---|
| 6,927,499 B2 | 8/2005 | Hibi et al. | |
| 7,496,380 B2 | 2/2009 | Park | |
| 2010/0198421 A1* | 8/2010 | Fahimi et al. | 700/291 |

FOREIGN PATENT DOCUMENTS

| | | |
|---|---|---|
| JP | 2003-244849 A | 8/2003 |
| JP | 2004-180467 A | 6/2004 |
| KR | 10-2002-0009167 A | 2/2002 |
| KR | 10-2004-0007072 A | 1/2004 |
| KR | 10-2005-0103727 A | 11/2005 |

OTHER PUBLICATIONS

English machine traslation of KR 2002-0021842.*
Korean Office Action dated Oct. 31, 2011 for Korean Patent Application No. KR 10-2010-0097368 which corresponds to captioned U.S. Appl. No. 13/071,370.

* cited by examiner

*Primary Examiner* — Ryan Jarrett
(74) *Attorney, Agent, or Firm* — Knobbe Martens Olson & Bear LLP

(57) ABSTRACT

A grid connected power storage system is disclosed. According to some aspects, an integration controller controlling a grid-connected power storage system may include a controller configured to change parallel data to be transmitted to a plurality of external devices to serial bit streams, change serial bit streams received from the plurality of external devices to parallel data, and output a path control signal that instructs a communication path of the serial bit streams. According to some aspects, a communication unit configured to change a communication path and a ground path of the serial bit streams according to the path control signal, and transmit and/or receive the serial bit streams through the changed communication path is provided. A number of isolators and interfaces for data communication with a plurality of external devices is reduced such that the structure of an integration controller may be simplified, and the size and production cost of the integration controller can be reduced.

15 Claims, 3 Drawing Sheets

GRID CONNECTED POWER STORAGE SYSTEM AND INTEGRATION CONTROLLER THEREOF

CROSS-REFERENCE TO RELATED APPLICATIONS

This application claims priority to and the benefit of Korean Patent Application No. 10-2010-0097368 filed in the Korean Intellectual Property Office on Oct. 6, 2010, the entire contents of which are incorporated herein by reference.

BACKGROUND

1. Field

The technological field relates to a grid-connected power storage system and an integration controller thereof. More particularly, the technological field relates to a grid-connected power storage system with a simple circuit, and an integration controller thereof.

2. Description of the Related Technology

Recently, the European Union (EU) has settled on a plan to increase the percentage of renewable energy of all electricity generation sources to 20% by the year 2020 and 50% by the year 2050. The US is planning to perform renewable portfolio standards (RPS). Since the percentage of renewable energy among all electricity generation sources is expected to increase to 30% to 40% in the future from the current rate of 5%, a power system should prepare for such a new change.

However, it is not easy to control the amount of electricity generation of renewable energy because the amount of electricity generated attributable to renewable energy is dependent on fluctuating natural conditions such as sunlight, wind power, and wave power. Thus, a method for overcoming a decline in power quality that may occur due to fluctuation of the renewable energy and in homogeneity between production and consumption time is undergoing research. The power quality may be evaluated based on voltage and frequency. When the supply amount and the demand amount of the renewable energy are not equal to each other in real time, abnormalities occur in voltage and frequency so that power quality of the entire power system may be deteriorated. Therefore, a system of electricity generation of renewable energy which addresses these abnormalities is desirable.

The above information disclosed in this Background section is only for enhancement of understanding of the background of the invention and therefore it may contain information that does not form the prior art that is already known to a person of ordinary skill in the art.

SUMMARY OF CERTAIN INVENTIVE ASPECTS

According to one aspect, a grid-connected power storage system that can exchange data with an external device, and an integration controller for the same are provided.

According to one aspect, an integration controller controlling a grid-connected power storage system includes a controller configured to change parallel data to be transmitted to a plurality of external devices to serial bit streams, change serial bit streams received from the plurality of external devices to parallel data, and output a path control signal that instructs a communication path of the serial bit streams; and a communication unit configured to change a communication path and a ground path of the serial bit streams according to the path control signal, and transmits and/or receives the serial bit streams through the changed communication path.

According to one aspect, a grid-connected power storage system according to includes a first power changing unit configured to change first power generated from an electric generator system to second power, a second power changing unit configured to change power between the second power and AC power of a common grid in bi-directions, a third power changing unit configured to change power of the second power and DC power of a power storage device in bi-directions, and an integration controller configured to control the first power changing unit, the second power changing unit, and the third power changing unit, wherein the integration controller is configured to change parallel data to be transmitted to a plurality of external devices into, change serial bit streams received from the plurality of external devices to parallel data, and change a communication path and a ground path of the serial bit streams to transmit and/or receive the serial bit streams through the changed communication path.

DETAILED DESCRIPTION OF CERTAIN INVENTIVE EMBODIMENTS

Figure 1:
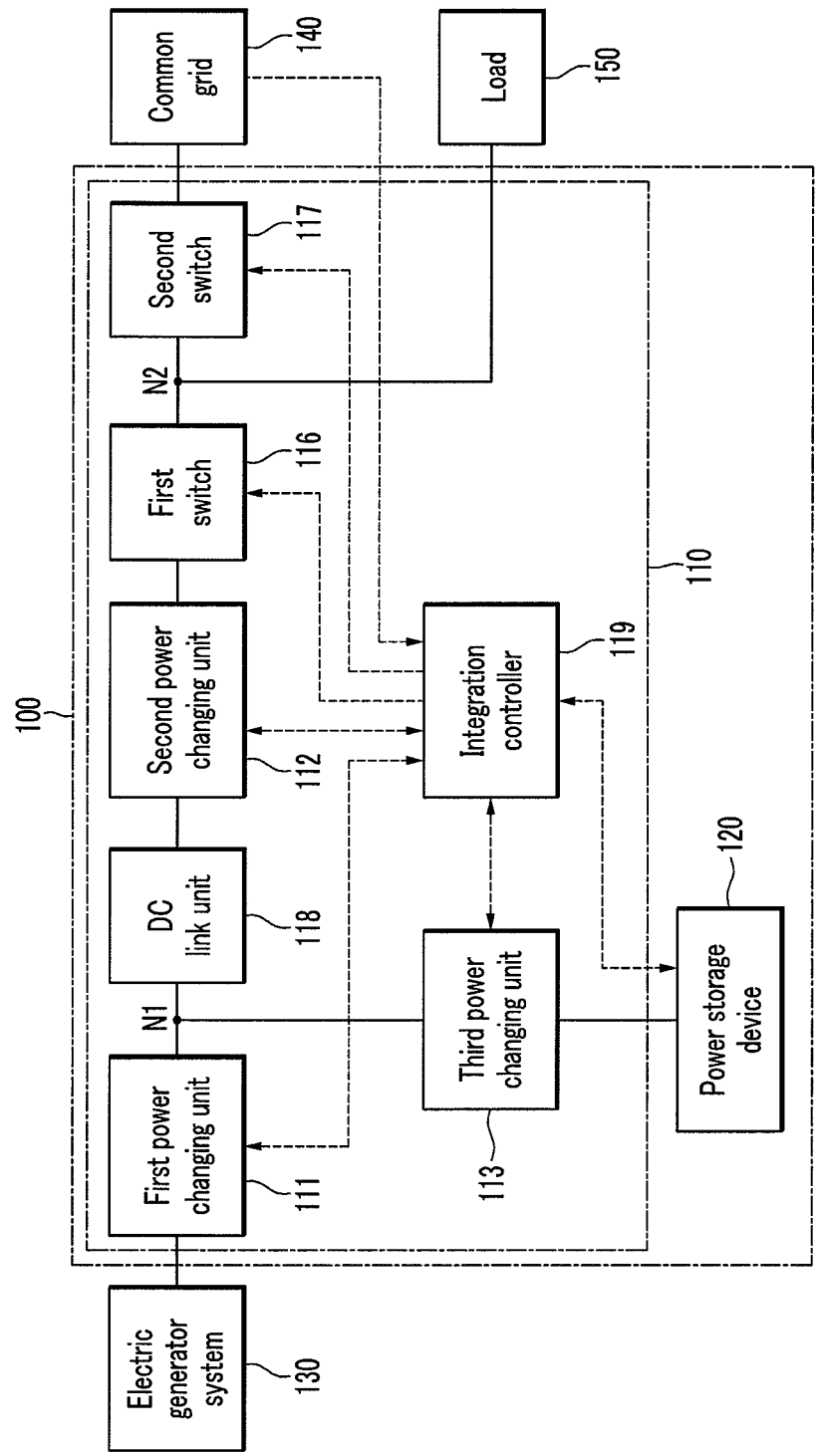
FIG. 1 is a block diagram of a grid-connected power storage system according to some embodiments.

Certain aspects will be described more fully hereinafter with reference to the accompanying drawings, in which exemplary embodiments are shown. As those skilled in the art would realize, the described embodiments may be modified in various ways without departing from the spirit or scope of the present invention.

Further, in the exemplary embodiments, like reference numerals designate like elements throughout the specification representatively in a first exemplary embodiment, and only elements other than those of the first exemplary embodiment will be described.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

A power storage system has can be useful for managing fluctuation of the renewable energy. Such a system charges electricity when a large amount of electricity is generated from the renewable energy and discharges electricity when the consumption amount is increased such that it can efficiently control the supply.

A power storage technique may include pumped storage power generation, compressed air energy storage (CAES), flywheel energy storage, superconducting magnetic energy storage (SMES), and/or rechargeable batteries. The pumped storage power generation is a method to pump water into an elevated reservoir (e.g., dam) during hours of low consumption and generate electricity by rotating a turbine through water discharge during hours of high consumption. The CAES is a method to store energy by compressing air during periods of low consumption such that the compressed air may be subsequently used for generating electricity. The generated electricity may be stored in underground caverns until needed. The flywheel energy storage is a method to generate electricity by running an electric generator using a rotating wheel during hours of high consumption and accelerate the rotation of the wheel during hours of low consumption. The SMES is a method for storing current in a superconducting coil having negligible resistance. As a battery that can be repeatedly charged and discharged, a rechargeable battery has been used as an uninterruptible power supply (UPS) that temporarily supplies electricity in case of a power failure, but, recently, it has been given attention as an auxiliary power source for renewable energy.

The power storage system may not only store electric generation power of the renewable energy in a rechargeable battery but may also store and use power of a common grid in connection with the common grid. The power storage system may also supply power stored in the rechargeable battery to the common grid, and supply the electric power generated by the renewable energy source to the common grid. Such a power storage system may be installed in large buildings, factory facilities, or personal residences. The operating conditions of the power storage system may be monitored and managed by a user. In order to communicate with the user to enable monitoring and management of the operating conditions, the power storage system needs to exchange data with an external device that can be used by the user.

FIG. 1 shows a block diagram of a grid-connected power storage system according to some embodiments.

Referring to FIG. 1, a grid-connected power storage system 100 may include a power management system 110 and a power storage device 120. The grid-connected power storage system 100 may be connected with an electric generator system 130, a common grid 140, and a load 150.

The electric generator system 130 may include a system generating electric renewable energy using sunlight, wind power, wave power, tidal power, or terrestrial heat. For example, a solar power generating system may include a solar cell module formed of a plurality of solar cells that change sunlight to electric energy. The plurality of solar cells may be connected in series or in parallel.

The common grid 140 may include a generation plant generating power through steam power generation, water power generation, or nuclear power generation. A substation may change the properties of a voltage or a current to transmit generated power through a power transmission line, power distribution line, or a transmission station.

The load 150 may include various electric driving devices consuming power. For example, the load may include home electronics, factory equipment, or the like.

The power management system 110 may be configured as a system that connects electric grids of power of the electric generator system 130, power of the common grid 140, and power of the power storage device 120. The power management system 110 may manage a time difference between production and consumption through power grids using the power storage device 120.

The power storage device 120 may include a rechargeable battery that can be repeatedly charged and discharged. The rechargeable battery may include a nickel-cadmium battery, a lead-acid battery, a nickel metal hydride battery, a lithium ion battery, and a lithium polymer battery, or the like. The power storage device 120 may be a large capacity storage device formed of a plurality of rechargeable batteries connected in parallel or in series.

A battery management system (BMS) that controls charging and discharging of the rechargeable battery may be included in the power storage device 120 or the power management system 110. The BMS may control the voltage, current, and temperature of the rechargeable battery and monitor the state of charge (hereinafter referred to as SOC) and the state of health (hereinafter referred to as SOH) to protect the rechargeable battery from overcharge, over-discharge, overcurrent, and overheat. The BMS may also improve efficiency of the rechargeable battery through cell balancing.

The power management system 110 may include a first power changing unit 111, a second power changing unit 112, a third power changing unit 113, a first switch 116, a second switch 117, a DC link unit 118, and an integration controller 119.

The first power changing unit 111 may be connected to the electric generator system 130, and may change first power generated from the electric generator system 130 to second power and transmit the second power to a first node N1. The first power generated from the electric generator system 130 may be DC power or AC power, and the second power in the first node N1 is DC power. That is, the first power changing unit 111 may perform a function of a converter that converts the first power that is AC power to second power that is DC power, or may perform a function of an inverter that inverts first power that is AC power to second power that is DC power. The first power changing unit 111 may perform maximum power point tracking (MPPT) control for maximizing power generated from the electric generator system 130. That is, the first power changing unit 111 may be an MPPT converter having a MPPT function.

The DC link unit 118 may be connected to the first node N1, and may maintain the voltage level of the first node N1 at a constant DC link voltage level. The DC link unit 118 prevents the voltage level of the first node N1 from being unstable due to one or more of a fluctuation of an output voltage of the electric generator system 130, an instantaneous voltage drop, and maximum load occurrence of the load 150 for normal operation of the second and third power changing units 112 and 113. The DC link unit 118 may be a DC link capacitor that is connected in parallel between the first node N1 and the second power changing unit 112. The DC link capacitor may include an electrolytic capacitor, a polymer capacitor, a multi-layer ceramic capacitor, or the like.

The second power changing unit 112 may be connected between the first node N1 and a second node N2. The common grid 140 and the load 150 may be connected to the second node N2. The second power changing unit 112 may change DC power to AC power and transmits the AC power to the second node N2. In addition, the second power changing unit 112 may change the AC power of the second node N2 to DC power and transmits the DC power to the first node N1. That is, the second power changing unit 112 may be configured to perform as a bi-directional inverter that inverts the DC power of the first node N1 and the AC power of the second node N2 in both directions. In the second node N2, AC power supplied to the common grid 140 and the load 150 or AC power supplied from the common grid 140 is formed.

The third power changing unit 113 may be connected between the first node N1 and the power storage device 120. The third power changing unit 113 may change the second DC power of the first node N1 to third DC power to be stored in the power storage device 120 and then transmit the changed power to the power storage device 120. Further, the third power changing unit 113 may change the third DC power in the power storage device 120 to the second DC power and transmit the changed power to the first node N1. That is, the third power changing unit 113 may be configured to perform a function of a bi-directional converter that changes DC power of the first node N1 and DC power of the power storage device 120 in both directions.

A first switch 116 may be connected between the second power changing unit 112 and the second node N2, and blocks power flow between the second power changing unit 112 and the second node N2. A second switch 117 may be connected between the second node N2 and the common grid 140, and may be configured to block power flow between the second node N2 and the common grid 140. For the first switch 116 and the second switch 117, a field effect transistor (FET), a bipolar junction transistor (BJT) or the like may be used.

Particularly, the second switch 117 may block power supply to the common grid 140 and realize separate driving of the grid-connected power storage system 100 when the common grid 140 is in abnormal conditions. When the second switch 117 is turned off, the grid-connected power storage system 100 is separated from the common grid 140 such that it can be separately driven using power from the electric generator system 130 and the power storage device 120. Power output from the grid-connected power storage system 100 may prevent the common grid 140 from being driven during abnormal conditions.

The integration controller 119 controls the entire operation of the power management system 110. The integration controller 119 receives information (i.e., sensing signals of voltage, current, and temperature) on power generated from the first power changing unit 111, receives power storage information including SOC and SOH from the power storage device 120 (or BMS), and receives grid information including the voltage, current, and temperature of a grid. The integration controller 119 controls a driving mode of the power management system 110 based on the power information generated from the electric generator system 130, the power storage information of the power storage device 120, and the grid information of the common grid 140.

The integration controller 119 receives sensing signals of the voltage, the current, and the temperature from the first power changing unit 111, the second power changing unit 112, and the third power changing unit 113. The integration controller may control power conversion efficiency of the respective power changing units 111, 112, and 113 according to the driving mode of the power management system 110. The integration controller 119 may control the turn-on/off of the first and second switches 116 and 117 according to the driving mode of the power management system 110.

The driving mode power management system 110 may be classified depending on a power supply method between at least two of the power storage device 120, the electric generator system 130, the common grid 140, and the load 150. The driving mode of the power management system 110 includes: (1) power supply from the electric generator system 130 to the power storage device 120; (2) power supply from the electric generator system 130 to the common grid 140; (3) power supply from the electric generator system 130 to the load 150; (4) power supply from the power storage device 120 to the common grid 140; (5) power supply from the power storage device 120 to the load 150; (6) power supply from the common grid 140 to the power storage device 120; and (7) power supply from the common grid 140 to the load 150.

In the case of (1), that is, when power is supplied from the electric generator system 130 to the power storage device 120, the integration controller 119 transmits an off signal to the first switch 116 to block power flow from the first node N1 to the second node N2. The first power generated from the electric generator system 130 is changed to second DC power in the first power changing unit 111, and a voltage of the second power is stabilized into a DC link voltage level by the DC link unit 118. The second power stabilized in the DC link voltage level is changed to third DC power in the third power changing unit 113 and then supplied to the power storage device 120 such that the rechargeable battery is charged.

In the case of (2), that is, when power is supplied from the electric generator system 130 to the common grid 140, the integration controller 119 transmits an off signal to the third power changing unit 113 to block power flow from the first node N1 to the power storage device 120. The integration controller 119 transmits an on signal to the first switch 116 and the second switch 117. The first power generated from the electric generator system 130 is changed to the second DC power in the first power changing unit 111, and the voltage of the second power is stabilized into the DC link voltage level by the DC link unit 118. The second power stabilized into the DC link voltage level is changed into DC power in the second power changing unit 112 and then supplied to the common grid 140. In this case, the second power changing unit 112 outputs AC power that corresponds to a power quality standard of the voltage and the current of the common grid 140. The power quality standard includes total harmonic distortion (THD) and a power factor.

In the case of (3), that is, when power is supplied from the electric generator system 130 to the load 150, the integration controller 119 transmits an off signal to the third power changing unit 113 and the second switch 117 to block power flow from the first node N1 to the power storage device 120 and the common grid 140. The integration controller 119 transmits an on signal to the first switch 116. The first power generated from the electric generator system 130 is changed to the second DC power in the first power changing unit 111, and the voltage of the second power is stabilized into the DC link voltage level by the DC link unit 118. When the second power stabilized into the DC link voltage level of the first node N1 is changed to AC power in the second power changing unit 112, it is then supplied to the load 150. The load 150 may be configured to use the AC power of the common grid 140, and the second power changing unit 112 outputs AC power that corresponds with the power quality standard of the common grid 140, used by the common grid 140.

In the case of (4), that is, when power is supplied from the power storage device 120 to the common grid 140, the integration controller 119 transmits an on signal to the first switch 116 and the second switch 117. DC power in an output voltage level of the power storage device 120 is changed to DC power of a DC link voltage level in the third power changing unit 113, and stabilized by the DC link unit 118. The power stabilized into the DC link voltage level of the first node N1 is changed into AC power in the second power changing unit 112 and then supplied to the common grid 140.

In the case of (5), that is, when power is supplied to the load 150 from the power storage device 120, the integration controller 119 transmits an on signal to the first switch 116 and transmits an off signal to the second switch 117. The DC power in the output voltage level of the power storage device 120 is changed to the DC power of the DC link voltage level in the third power changing unit 113 and stabilized by the DC link unit 118. The power stabilized into the DC link voltage level of the first node N1 is changed to AC power in the second power changing unit 112 and then supplied to the load 150.

In the case of (6), that is, when power is supplied from the common grid 140 to the power storage device 120, the integration controller 119 transmits an on signal to the first switch 116 and the second switch 117. The AC power of the common grid 140 is rectified by the second power changing unit 112 and then changed to DC power of the DC link voltage level. The DC power of the DC link voltage level of the first node N1 is changed to DC power of a voltage level for power storage in the third power changing unit 113 and then supplied to the power storage device 120.

In the case of (7), that is, when power is supplied from the common grid 140 to the load 150, the integration controller 119 transmits an off signal to the first switch 116 and transmits an on signal to the second switch 117. The AC power of the common grid 140 is supplied to the load 150.

In the above description, the driving mode of the power management system 110 is classified depending on the power supply method between the power storage system 120, the electric generator system 130, the common grid 140, and the load 150, but the power supply method may be further complicated, and accordingly, the driving mode of the power management system 110 may be varied. For example, power may be supplied from the electric generator system 130 to the power storage device 120 and the load 150, or may be supplied to the load from the electric generator system 130 and the power storage device 120. Alternatively, power may be supplied to the common grid 140 and the load 150 from the electric generator system 130 and the power storage device 120.

Figure 2:
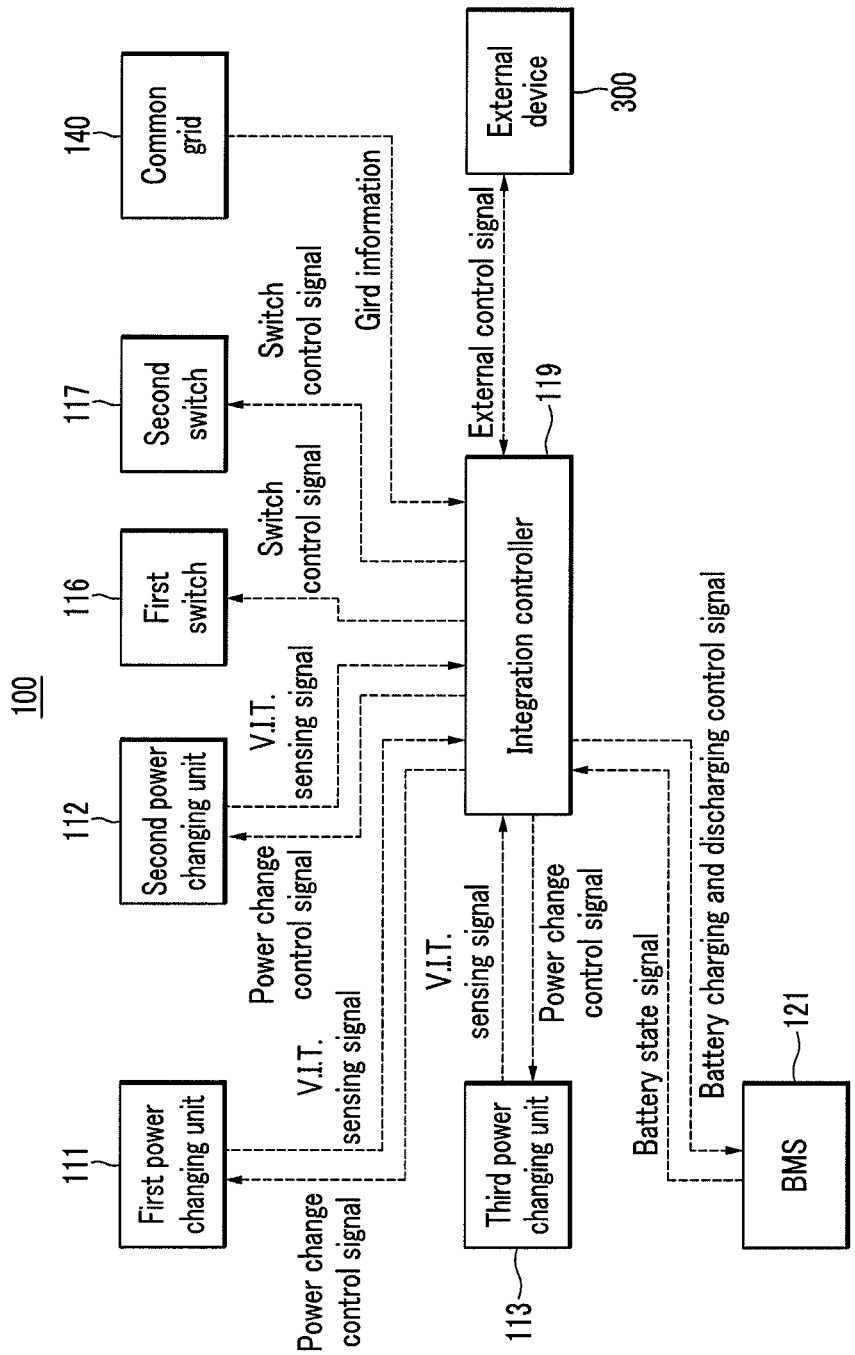
FIG. 2 is a block diagram showing a signal flow in the grid-connected power storage system according to some embodiments.

FIG. 2 is a block diagram showing signal flow in the grid-connected power storage system according to the exemplary embodiment of the present invention.

Referring to FIG. 2, the integration controller 119 controls driving of the grid-connected power storage system 100 and determines a driving mode of the grid-connected power storage system 100.

The integration controller 119 receives a sensing signal of a voltage V, a current I, and a temperature (T) from the first power changing unit 111, the second power changing unit 112, and the third power changing unit 113. The integration controller 119 transmits a power change control signal to the first power changing unit 111, the second power changing unit 112, and the third power changing unit 113 based on the V.I.T sensing signal. The power change control signal is a signal that controls power change efficiency of the respective power changing units 111, 112, and 113.

The integration controller 119 transmits a switch control signal that controls the turn-on/off of the first and second switches 116 and 117 according to a driving mode of the grid-connected power storage system 100.

The integration controller 119 receives grid information including a voltage, a current, a temperature, and a grid situation of the common grid 140. The integration controller 119 determines occurrence of an abnormal condition or electric power recovery according to the grid information. The integration controller 119 turns on/off the second switch 117 according to the circumstance of the common grid 140 to perform a separate operation of the grid-connected power storage or to prevent a separate operation of the grid-connected power storage.

The integration controller 119 determines a charging and discharging state of the battery by receiving a battery state signal from the BMS 121. The battery state signal may include SOC or SOH. The integration controller 119 may determine a driving mode according to the charging and discharging state of the battery, and may transmit a battery charging and discharging signal to the BMS 121 according to the driving mode. The BMS 121 controls charging and discharging of the battery according to the battery charging and discharging control signal.

The integration controller 119 may exchange an external control signal with an external device 300 such as a motor, an input device, or an external control device so that a user can monitor and control the driving state of the grid-connected power storage system 100. The integration controller 119 may transmit driving state information to the external device 300 and receive a control signal of the user from the external device 300 such that the grid-connected power storage system 100 can be controlled.

As described, the integration controller 119 may perform data transmission and receiving with the external device 300 for the user while transmitting and receiving signals with a plurality of units included in the grid-connected power storage system 100. The integration controller 119 can use a universal asynchronous receiver/transmitting (UART) that can stably transmit and receive data at a remote distance for transmitting and receiving data with the external device 300 without being interrupted by noise.

The integration controller 119 that can transmit and receive data with the external device 300 using UART communication will now be described.

Figure 3:
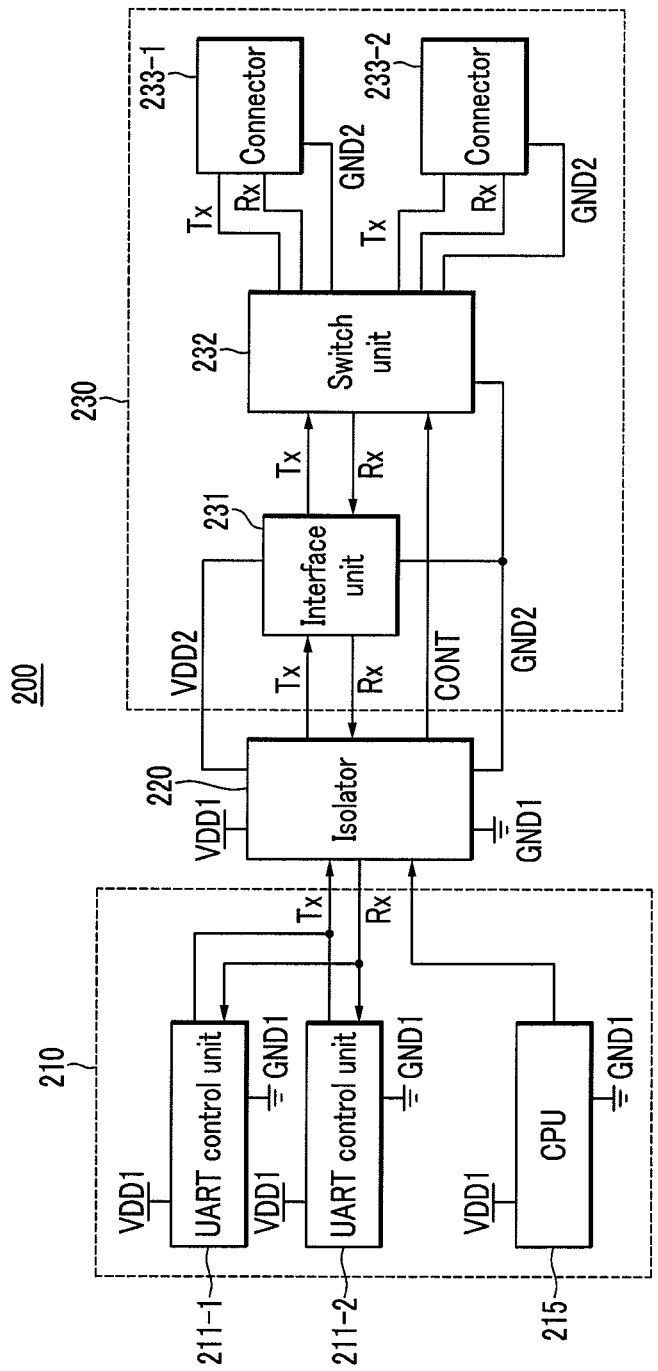
FIG. 3 is a block diagram of an integration controller of the grid-connected power storage system according to some embodiments.

FIG. 3 is a block diagram of the integration controller of the grid-connected power storage system according to some embodiments.

Referring to FIG. 3, the integration controller includes a control unit 210, an isolator 220, and a communication unit 230. The control unit 210 includes a computer processing unit (CPU) 215 which may perform the entire data processing function of the integration controller. The control unit 210 may also include a plurality of UART control units 211-1 and 211-2 changing the data type for data communication. Here, the number of the plurality of UART control units 211-1 and 211-2 is not limited to two units, but rather the number of UART control units is unlimitedly provided corresponding to the number of connectors.

The CPU 215 may control the entire function of the UART control units 211-1 and 211-2 and the communication unit 230. The CPU 215 may receive parallel data from a plurality of external devices and generate parallel data to be transmitted to the plurality of external devices. That is, the CPU 215 processes parallel data respectively transmitted to and received from the plurality of external devices. In addition, the CPU 215 transmits a path control signal CONT that instructs a transmission and receiving path with the plurality of external devices to be changed to the communication unit 230.

The plurality of UART control units 211-1 and 211-2 may be connected to the communication unit 230 through a single transmission channel Tx and a single receiving channel Rx such that the plurality of UART control units 211-1 and 211-2 use one interface. The plurality of UART control units 211-1 and 211-2 convert the parallel data generated from the CPU 215 into serial bit streams and transmit the same to the communication unit 230 through the transmission channel Tx. In addition, the plurality of UART control units 211-1 and 211-2 restore the serial bit streams transmitted through the receiving channel Rx from the communication unit 230 into parallel data and transmit the same to the CPU 215.

The plurality of UART control units 211-1 and 211-2 and the CPU 215 are connected to a first power source VDD1 and a first ground GND1, and they are respectively driven using voltages of the first power source VDD1 and the first ground GND1. That is, the control unit 210 uses a voltage of the first power source VDD1 and a voltage of the first ground GND1.

The isolator 220 electrically separates the control unit 210 and the communication unit 230, and performs mutual transmission of the serial bit streams and the path control signal CONT between the control unit 210 and the communication unit 230. The isolator 220 protects the control unit 210 and the communication unit 230 from impulse, noise, and surge occurring therebetween, and maintains an equivalent potential by bypassing an abnormal signal to the ground. The isolator 220 connects the first power source VDD1 and the first ground GND1 to the control unit 210 side and connects the second power source VDD2 and the second ground GND2 to the communication unit 230 side. For the isolator 220, a transformer isolator, an optical isolator or the like may be used.

The communication unit 230 may include an interface unit 231 connected to the plurality of UART control units 211-1 and 211-2 through one transmission channel Tx and one receiving channel Rx. The communication unit 230 may further include a switch unit 232 for switching a communication path and a ground path according to the path control signal CONT transmitted from the CPU 215, and a plurality of connectors 233-1 and 233-2 respectively connected to the plurality of external devices. The number of the plurality of connectors 233-1 and 233-2 is illustrated as two connectors, but it is not limited thereto. That is, the number of connectors may correspond to the number of external devices.

The interface unit 231 and the plurality of connectors 233-1 and 233-2 are connected to the second power source VDD2 and the second ground GND2, and they are respectively driven using voltages of the second power source VDD2 and the second ground GND2. That is, the communication unit 230 uses a voltage of the second power source VDD2 and a voltage of the second ground GND2.

The interface unit 231 may transmit serial bit streams through a communication unit connected with one of the plurality of connectors 233-1 and 233-2 through the switch unit 232. The interface unit 231 may be an interface or a serial port that serially accesses the plurality of external devices. The interface unit 231 may follow the RS-232 standard.

The switch unit 232 may be connected with the plurality of connectors 233-1 and 233-2 through the communication path and the ground path. The switch unit 232 may connect the communication path and the ground path with one of the plurality of connectors 233-1 and 233-2 depending on the path control signal CONT. The communication path may include at least one of the transmission channel Tx and the receiving channel Rx. The ground path is configured as a path through which the second ground GND2 connected to the interface unit 231 is connected to one of the plurality of connectors, to which the communication path is connected. That is, the connector to which the communication path is connected is connected to the second ground GND2 through the ground path.

When communication interfaces are individually used to the respective connectors, the ground of each channel may be separated. The isolator may therefore be provided corresponding to the number of connectors for separating the grounds of the communication interfaces with the UART control unit. However, this may cause the structure of the integration controller to be complicated and increases production cost.

According to some aspects, the plurality of UART control units 211-1 and 211-2 may be connected to one interface unit 231 through one transmission channel Tx and one receiving channel Rx. The UART control units 211-1 and 211-2 may also be connected to the communication path and the ground path with the plurality of connectors 233-1 and 233-2. The connectors 233-1 and 233-3 may be changed using the switch unit 232 such that the number of communication interfaces can be reduced and the number of isolators respectively required for the communication interfaces can be reduced to one.

As discussed above, a grid-connected power storage system that can exchange data with an external device, and an integration controller for the same are provided. The integration controller may further include an isolator electrically separating the controller and the communication unit.

A control unit may use a first power source and a first ground, and the communication unit may use a second power source and a second ground. The communication unit may include a plurality of connectors respectively connected with the plurality of external devices, and a switch unit respectively connected with the plurality of connectors through the communication path and the ground path. The switch unit may be configured to change a communication path and a ground path connected with each of the plurality of connectors according to a path control signal. The control unit may also include an interface unit configured to transmit the serial bit streams through the communication path connected by the switch unit.

The connector to which the communication path is connected may be connected with the second ground through the ground path. The interface unit may transmit the serial bit streams according to the RS-232 standard.

The control unit may include a computer processing unit (CPU) processing parallel data corresponding to each of the plurality of external devices and a universal asynchronous receiver/transmitter (UART) control unit changing parallel data transmitted to the plurality of external devices to serial bit streams, and restoring serial bit streams received from the plurality of external devices. The UART control unit may be provided corresponding with the number of connectors.

The integration controller may include a controller configured to change the parallel data to serial bit streams and output a path control signal that instructs a communication path of the serial bit streams. A communication unit may be included and may be configured to change a communication path and a ground path of the serial bit streams according to the path control signal, and transmit and/or receive the serial bit streams through the changed communication path.

The control unit may use a first power source and a first ground, and the communication unit may use a second power source and a second ground. The integration controller may further include an isolator that electrically separates the control unit and the communication unit.

The communication unit may include a plurality of connectors respectively connected with the plurality of external devices, a switch unit respectively connected with the plurality of connectors through a communication path and a ground path. The switch unit may be configured to change the communication path and the ground path respectively connected with the plurality of connectors according to a path control signal. An interface unit may be provided and may be configured to transmit the serial bit stream through a communication path connected by the switch unit.

A connector to which the communication path is connected may be connected to the second ground through the ground path. The interface unit may transmit the serial bit streams according to the RS-232 standard.

The control unit may include a CPU processing parallel data corresponding to each of the plurality of external devices and a UART control unit changing parallel data transmitted to the plurality of external devices to serial bit streams and restoring serial bit streams received from the plurality of external devices. The number of UART control unit may be provided corresponding to the number of connectors.

In a grid-connected power storage system, the number of isolators and interfaces for receiving and transmitting data with a plurality of external devices can be reduced to one such that the structure of the integration controller can be simplified, and the size and production cost of the integration controller can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, it will be appreciated to those skilled in the art that various modifications are made and other equivalent embodiments are available. Accordingly, the actual scope of the present invention is determined by the spirit of the appended claims.

What is claimed is:

1. An integration controller controlling a grid-connected power storage system, comprising:
    a controller configured to:
        change parallel data to be transmitted to a plurality of external devices to serial bit streams;
        change serial bit streams received from the plurality of external devices to parallel data; and
        output a path control signal that instructs a communication path of the serial bit streams;
    a communication unit configured to change a communication path and a ground path of the serial bit streams according to the path control signal, and transmit and/or receive the serial bit streams through the changed communication path; and
    an isolator configured to electrically separate the controller from the communication unit, wherein the controller is connected to a first power source and a first ground connection and the communication unit is connected to a second power source and a second ground connection.

2. The integration controller of claim 1, wherein the communication unit comprises:
    a plurality of connectors respectively connected with the plurality of external devices;
    a switch unit connected respectively with the plurality of connectors through the communication path and the ground path, wherein the switch unit is configured to change a communication path and a ground path connected with each of the plurality of connectors according to the path control signal; and
    an interface unit configured to transmit the serial bit streams through the communication path connected by the switch unit.

3. The integration controller of claim 2, wherein the connector to which the communication path is connected is connected with the second ground connection through the ground path.

4. The integration controller of claim 2, wherein the interface unit is configured to transmit the serial bit streams according to the RS-232 standard.

5. The integration controller of claim 2, wherein the control unit comprises:
    a computer processing unit (CPU) configured to process parallel data corresponding to each of the plurality of external devices; and
    a universal asynchronous receiver/transmitter (UART) control unit configured to change parallel data transmitted to the plurality of external devices to serial bit streams, and restore serial bit streams received from the plurality of external devices.

6. The integration controller of claim 5, wherein the number of UART control units is provided corresponding with the number of connectors.

7. A grid-connected power storage system comprising:
    a first power changing unit configured to change first power generated from an electric generator system to second power;
    a second power changing unit configured to change power between the second power and AC power of a common grid in bi-directions;
    a third power changing unit configured to change power of the second power and DC power of a power storage device in bi-directions; and
    an integration controller configured to control the first power changing unit, the second power changing unit, and the third power changing unit,
    wherein the integration controller is configured to change parallel data to be transmitted to a plurality of external devices into serial bit streams, change serial bit streams received from the plurality of external devices to parallel data, and change a communication path and a ground path of the serial bit streams to transmit and/or receive the serial bit streams through the changed communication path, the integration controller comprising:
        a control unit configured to change the parallel data to serial bit streams and output a path control signal that instructs a communication path of the serial bit streams; and
        a communication unit configured to change a communication path and a ground path of the serial bit streams according to the path control signal, and transmit and/or receive the serial bit streams through the changed communication path; and
    wherein the control unit is connected to a first power source and a first ground, and the communication unit is connected to a second power source and a second ground.

8. The grid-connected power storage system of claim 7, wherein the integration controller further comprises an isolator configured to electrically separate the control unit and the communication unit.

9. The grid-connected power storage system of claim 8, wherein the communication unit comprises:
    a plurality of connectors respectively connected with the plurality of external devices;
    a switch unit respectively connected with the plurality of connectors through a communication path and a ground path, and configured to change the communication path and the ground path respectively connected with the plurality of connectors according to the path control signal; and
    an interface unit configured to transmit the serial bit stream through a communication path connected by the switch unit.

10. The grid-connected power storage system of claim 9, wherein a connector to which the communication path is connected to the second ground through the ground path.

11. The grid-connected power storage system of claim 9, wherein the interface unit is configured to transmit the serial bit streams according to the RS-232 standard.

12. The grid-connected power storage system of claim 9, wherein the control unit comprises:
    a computer processing unit (CPU) configured to process parallel data corresponding to each of the plurality of external devices; and a universal asynchronous receiver/transmitter (UART) control unit configured to change parallel data transmitted to the plurality of external devices to serial bit streams and restore serial bit streams received from the plurality of external devices.

13. The grid-connected power storage system of claim 12, wherein the number of UART control units is provided corresponding to the number of connectors.

14. The grid-connected power storage system of claim 7, wherein the integration controller is further configured to:
   receive information regarding at least one of a voltage, current, and temperature from each of the first, second and third power changing units; and
   control a driving mode of the power storage system based on the received information.

15. The grid-connected power storage system of claim 7, wherein the integration controller is configured to:
   receive a state of charge (SOC) or state of health (SOH) from a power storage device; and
   control a charge or discharge of the power storage device based on the received SOC or SOH information.

* * * * *

UNITED STATES PATENT AND TRADEMARK OFFICE
CERTIFICATE OF CORRECTION

PATENT NO. : 8,532,833 B2  
APPLICATION NO. : 13/071370  
DATED : September 10, 2013  
INVENTOR(S) : Seong-Joong Kim Page 1 of 1

It is certified that error appears in the above-identified patent and that said Letters Patent is hereby corrected as shown below:

On the Title Page, item (56) in column 2, under Other Publication, change "traslation" to --translation--.

In the Drawings

In Figure 2 (sheet 2 of 9) Change "Gird" to --Grid--.

Signed and Sealed this
Thirteenth Day of May, 2014

Michelle K. Lee
*Deputy Director of the United States Patent and Trademark Office*